UNITED STATES PATENT OFFICE.

LUTHER R. SCAMMELL, OF ADELAIDE, SOUTH AUSTRALIA.

PROCESS OF OBTAINING EUCALYPTOL.

SPECIFICATION forming part of Letters Patent No. 557,431, dated March 31, 1896.

Application filed November 16, 1894. Serial No. 529,045. (Specimens.)

*To all whom it may concern:*

Be it known that I, LUTHER ROBERT SCAMMELL, manufacturing chemist, a subject of the Queen of Great Britain, residing at King William Street, Adelaide, in the Province of South Australia, have invented an Improved Process for the Extraction and Estimation of Eucalyptol; and I do hereby declare that the following is a full, clear, and exact description of the invention, which will enable others skilled in the art to which it appertains to make and use the same.

My invention relates to an improved process for the extraction of the chemical substance commonly known as "eucalyptol" or "cineol" from eucalyptus-oil or any other volatile oil containing the same. It permits also of a more accurate estimation of the eucalyptol contained in any given sample of oil than by any process at present in use.

My improved process consists essentially of the addition to the essential oil of eucalyptus or other volatile oil containing eucalyptol of a solution of phosphoric acid.

For the purposes of the process the oil to be treated should be preferably at an ordinary temperature and not higher than about 60° Fahrenheit, and the solution of phosphoric acid should have a specific gravity of not less than 1.750, but preferably 1.785; but I wish it be distinctly understood that I do not confine myself to this exact strength, though finding it well answers the purpose. The effect of this addition is to produce or precipitate a crystalline compound of eucalyptol phosphate.

The crystalline compound of eucalyptol phosphate so formed is then separated from the other constituents of the oil by any known process, such as pressure or centrifugal action, and the salt is subsequently decomposed by hot water for the production of a fluid absolute eucalyptol which floats over the phosphoric-acid solution and may be separated by decantation.

The process hereinbefore mentioned permits of the production of absolute eucalyptol or of its estimation without fractional distillation and at an ordinary temperature instead of recourse being had to freezing, as required by the methods of extraction or determination at present in use.

Every oil derived from every known species of eucalyptus has been successfully treated as described, even the essential oil of *Eucalo amygdalina*, which is not rated in the *United States Pharmacopeia* as containing eucalyptol. However, I chiefly use *E. cneorifolia*.

Having thus described the nature of my said invention and the best means I know for carrying the same into practical effect, I claim—

1. The herein-described process for the extraction of eucalyptol from eucalyptus-oil and other volatile oils containing the same, consisting in adding to the eucalyptus-oil, &c., a solution of phosphoric acid, and subsequently decomposing the eucalyptol phosphate so formed, substantially as described.

2. The herein-described process of extracting eucalyptol from eucalyptus and like oils, consisting in first, mixing the oils with a solution of phosphoric acid under ordinary temperatures; second, separating the resultant eucalyptol-phosphate salts from the oils; third, decomposing said salts in hot water, and finally removing the absolute eucalyptol from the phosphoric-acid solution, substantially as set forth.

In testimony whereof I have signed my name to this specification, in the presence of two subscribing witnesses, this 19th day of September, A. D. 1894.

LUTHER R. SCAMMELL.

Witnesses:
CHARLES S. BURGESS,
CLEMENT A. HACK.